United States Patent
Seki et al.

(10) Patent No.: US 10,960,732 B2
(45) Date of Patent: Mar. 30, 2021

(54) HEATER DEVICE

(71) Applicant: DENSO CORPORATION, Kariya (JP)

(72) Inventors: Hideki Seki, Kariya (JP); Kimitake Ishikawa, Kariya (JP); Hiroyasu Oide, Kariya (JP); Yuusuke Tanaka, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 453 days.

(21) Appl. No.: 15/744,025

(22) PCT Filed: Aug. 11, 2016

(86) PCT No.: PCT/JP2016/073692
§ 371 (c)(1),
(2) Date: Jan. 11, 2018

(87) PCT Pub. No.: WO2017/047301
PCT Pub. Date: Mar. 23, 2017

(65) Prior Publication Data
US 2018/0208021 A1  Jul. 26, 2018

(30) Foreign Application Priority Data
Sep. 15, 2015  (JP) .............................. JP2015-182173

(51) Int. Cl.
*B60H 1/22* (2006.01)
*H05B 3/20* (2006.01)
(Continued)

(52) U.S. Cl.
CPC ....... *B60H 1/2225* (2013.01); *B60H 1/00021* (2013.01); *B60H 1/00742* (2013.01);
(Continued)

(58) Field of Classification Search
CPC .. B60H 1/2225; B60H 1/2215; B60H 1/2227; B60H 1/2226; B60H 1/00021;
(Continued)

(56) References Cited

U.S. PATENT DOCUMENTS 7,500,536 B2 *  3/2009  Bulgajewski ............ H05B 3/34
                                                                    177/136
9,093,920 B2 *  7/2015  Hamanaka ................ B60L 3/04
(Continued)

FOREIGN PATENT DOCUMENTS

JP  S63127032 A  5/1988
JP  2009009835 A  1/2009
(Continued)

*Primary Examiner* — Tu B Hoang
*Assistant Examiner* — Yeong Juen Thong
(74) *Attorney, Agent, or Firm* — Harness, Dickey & Pierce, P.L.C.

(57) ABSTRACT

The heater device has a sheet shaped main body having a heat generating portion heated by energization and a radiating surface for radiating radiant heat toward a heating object by using heat in the heat generating portion, a plate shaped member arranged on an opposite side with respect to the radiating surface of the main body, and an air layer forming member for forming an air layer between the main body and the plate shaped member arranged on a side opposite to the radiating surface of the main body.

6 Claims, 5 Drawing Sheets

(51) Int. Cl.
*F24H 3/00* (2006.01)
*F24D 13/02* (2006.01)
*B60H 1/00* (2006.01)
*F24D 19/02* (2006.01)

(52) U.S. Cl.
CPC ......... *B60H 1/2215* (2013.01); *B60H 1/2226* (2019.05); *B60H 1/2227* (2019.05); *F24D 13/02* (2013.01); *F24D 19/024* (2013.01); *F24H 3/002* (2013.01); *H05B 3/20* (2013.01); *B60H 2001/00128* (2013.01); *F24H 2250/02* (2013.01); *H05B 2203/032* (2013.01)

(58) Field of Classification Search
CPC ...... B60H 1/00742; B60H 2001/00128; H05B 3/20; H05B 2203/032; H05B 3/32; H05B 3/34; F24H 3/002; F24H 19/024; F24H 2250/02; F24D 13/02

USPC .......... 219/217, 202; 392/432, 687; 180/273
See application file for complete search history.

(56) References Cited

U.S. PATENT DOCUMENTS

| | | | |
|---|---|---|---|
| 2003/0141983 | A1* | 7/2003 | Schmiz ................ H05B 3/34 340/687 |
| 2007/0090293 | A1* | 4/2007 | Ichihara ................ H01L 37/00 250/339.1 |
| 2007/0290532 | A1* | 12/2007 | Frank ...................... B60N 2/002 297/180.12 |
| 2012/0267354 | A1* | 10/2012 | Okamoto ............. B60H 1/2227 219/202 |
| 2015/0110477 | A1* | 4/2015 | Ota ....................... B60H 1/2227 392/435 |
| 2015/0162747 | A1* | 6/2015 | Iwasaki ................. G01R 31/50 361/90 |
| 2015/0345998 | A1* | 12/2015 | Lamesch ................. G01D 5/24 324/686 |
| 2016/0039265 | A1 | 2/2016 | Ota et al. |
| 2016/0059669 | A1 | 3/2016 | Sagou et al. |
| 2016/0059670 | A1* | 3/2016 | Satzger .................. H05B 3/22 219/202 |

FOREIGN PATENT DOCUMENTS

| | | |
|---|---|---|
| JP | 2014189251 A | 10/2014 |
| JP | 2014190674 A | 10/2014 |

* cited by examiner

US 10,960,732 B2

HEATER DEVICE

CROSS REFERENCE TO RELATED APPLICATIONS

This application is a U.S. National Phase Application under 35 U.S.C. 371 of International Application No. PCT/JP2016/073692 filed on Aug. 11, 2016 and published in Japanese as WO 2017/047301 A1 on Mar. 23, 2017. This application is based on and claims the benefit of priority from Japanese Patent Application No. 2015-182173 filed on Sep. 15, 2015. The entire disclosures of all of the above applications are incorporated herein by reference.

TECHNICAL FIELD

The present disclosure relates to a heater device for radiating radiant heat by heat in a heat generating portion, which is heated by energization.

BACKGROUND ART

A conventional heater device has a plurality of heat generating portions and a main body arranged so as to surround the heat generating portions. The main body has a lower heat conductive rate than the heat conductive rate of the heat generating portions. The heater device is described in Patent Literature 1. In the heater device, when an object contacts the heat generating portion, a temperature at contacted part rapidly reduced. When a human body touches the heat generating portion, a thermal discomfort to the human can be reduced. In this heater device, the detection portion for detecting a proximity or a contact of the object to the heat generating portion is provided integrally with the main body of the heater device. When the proximity or the contact of the object to the heat generating portion is detected by the detection portion, an output of the heater device is reduced or stopped.

PRIOR ART LITERATURES

Patent Literature 1: Japanese Patent Publication No. 2014-190674

SUMMARY OF INVENTION

In our inventor's understanding, when a thickness of the main body increases, a heat capacity of the heater device increases. A transfer amount of heat from the heater device to the object increases.

When the thickness of the heater device increases, the heat capacity of the heater device increases such that the heat transfer amount from the heater device to the object increases. An effect of lowering the temperature of the touched part is impaired.

The present disclosure aims to suppress the amount of heat transfer from the heater device to the object in contact with the heater device even if the thickness of the heater device including the main body is large.

According to one aspect in the present disclosure, the heater device has a sheet shaped main body having a heat generating portion heated by energization and a radiating surface configured to radiate radiant heat toward a heating object by using heat in the heat generating portion, a plate shaped member arranged on the main body and on an opposite side with respect to the radiating surface of the main body, and an air layer forming member configured to form an air layer between the main body and the plate shaped member arranged on a side opposite to the radiating surface of the main body.

According to the above configuration, the air layer forming member for forming an air layer between the main body and the plate shaped member is provided on the side opposite to the radiating surface of the main body. A heat amount transmitted from the plate shaped member to the main body is suppressed, and a heat amount transmitted from the plate shaped member to the main body is also suppressed. Even if the thickness of the heater body including the body part is large, the heat transfer amount from the heater body to the object in contact with the heater body is suppressed.

EMBODIMENTS FOR CARRYING OUT INVENTION

Figure 1:
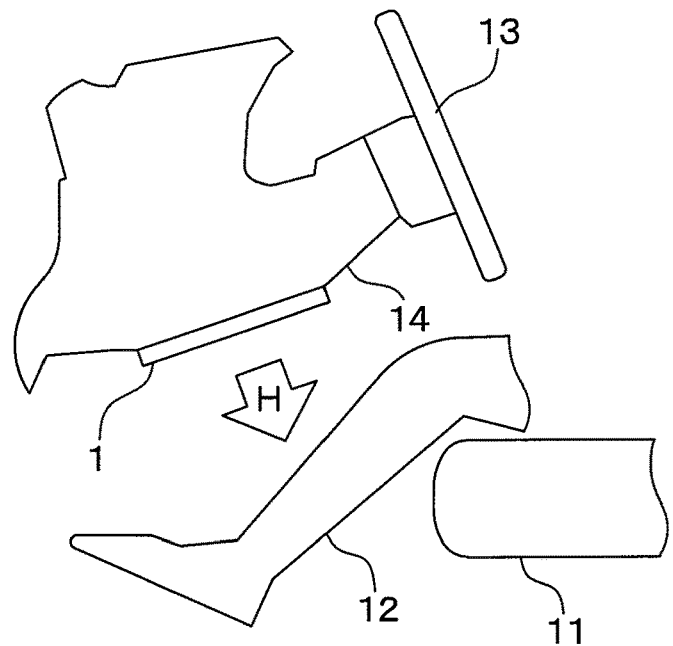
FIG. 1 is a diagram illustrating a schematic view of a heater device attached on a vehicle in a first embodiment.

Plural embodiments are explained below with reference to the drawings. In the embodiments, a part that corresponds to a matter described in a preceding embodiment may be assigned with the same reference numeral.

First Embodiment

The first embodiment is explained based on FIGS. 1 to 6. In FIG. 1, a heater device 1 according to the first embodiment is installed inside of a road traveling vehicle. The heater device 1 corresponds to a part of a heater system for heating an interior. The heater device 1 is an electric heater that emits heat by being supplied with electric power from a power source such as battery or generator mounted in the mobile unit. The heater device 1 has a thin plate shaped. The heater device 1 generates heat when electric power is supplied. The heater device 1 radiates radiant heat H mainly in a direction perpendicular to a surface of the heater device 1 for the purpose of heating an object located in the direction perpendicular to the surface.

A seat 11 on which an occupant 12 is to be seated is installed in the interior. The heater device 1 is installed to radiate the radiant heat H toward feet of the occupant 12. The heater device 1 can be used as equipment for offering warmth immediately to the occupant 12, for example, immediately after starting the other heating equipment. The heater device 1 is installed on a wall surface of the interior. The heater device 1 is installed to face the occupant 21 with an expected normal posture. For example, a vehicle that drives on a road has a steering column 14 supporting a steering wheel 13. The heater device 1 can be installed on a lower surface of the steering column 14 so as to oppose the occupant 21.

Figure 2:
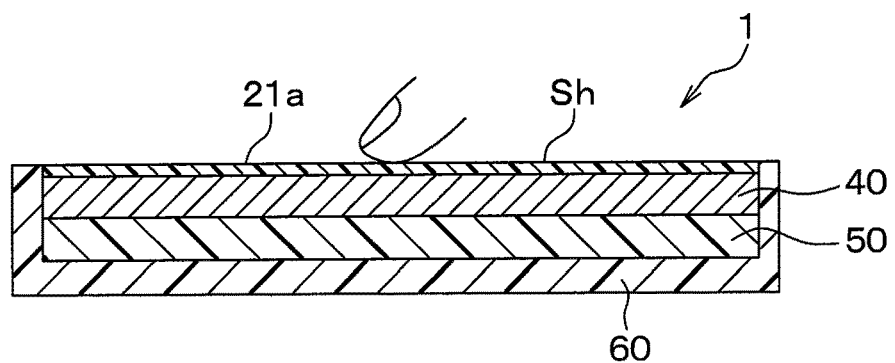
FIG. 2 is a diagram illustrating a schematic cross sectional view of the heater device.

FIG. 2 is a cross sectional view of the heater device in the present embodiment. The heater device 1 has a heater body 40, a heat insulating member 50, and a heater housing 60.

The heater body 40 has a radiating surface Sh for radiating the radiant heat H toward the heating object by using heat of a heat generating portion 25.

The heat insulating member 50 suppresses the heat radiated from the heater body 40 from transferring to the heater housing 60.

The heater housing 60 is made of a plastic resin, such as PP or ABS resin. PP is an abbreviation of polypropylene. The ABS is an artificial word in which an initial letter of acenitrile, butadiene, and styrene is arranged. The heater housing 60 is a box shaped. The heat insulating member 50 is placed on a bottom of the heater housing 60, and the heater body 40 is placed on an upper side of the heat insulating member 50.

Figure 3:
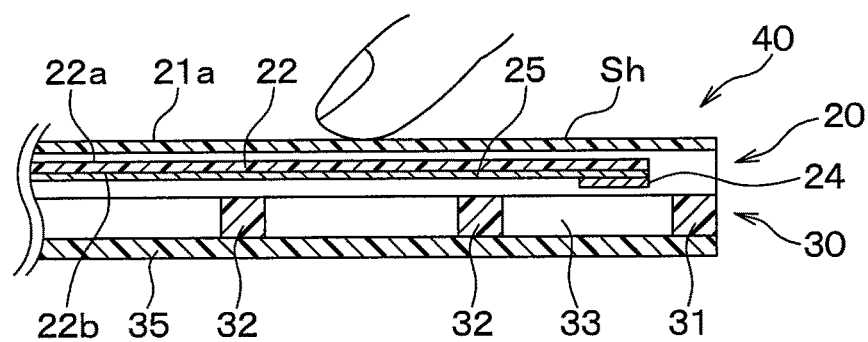
FIG. 3 is a diagram illustrating a cross sectional view of a heater body.

FIG. 3 is a cross sectional view of the heater body 40. The heater body 40 has a main body 20, a plate shaped member 35, and an air layer forming member 30.

The main body 20 has an insulated board 22, a power supply part 24, the heat generating portion 25 which is heated by energization, and the radiating surface Sh for radiating the radiant heat H toward the heating object by using heat of the heat generating portion 25. The main body 20 has a thin sheet shape. The configuration of the main body 20 is later explained in detail.

The plate shaped member 35 being a plate shaped is located on the main body and on the side opposite to the radiating surface Sh in the main body 20. The plate shaped member 35 is formed of an insulating material.

The air layer forming member 30 for forming an air layer 33 is interposed between the main body 20 and the plate shaped member 35. The air layer forming member 30 has a fixing part 31 and a spacer 32. The air layer 33 is formed between the main body 20 and the plate shaped member 35 by the air layer forming member 30. A thickness of the air layer 33 is several tens of microns or more and one millimeter or less.

The fixing part 31 has a rectangular shape, and is made of a resin. The fixing part 31 is provided between the main body 20 and the plate shaped member 35 and along an outer edge of the main body 20 and the plate shaped member 35. The fixing part 31 is adhered between the main body 20 and the plate shaped member 35 by an adhesive.

The spacer 32 has a cylindrical shape, and is made of acrylic resin, for example. The spacer 32 is configured to form the air layer between main body 20 and the plate shaped member 35. The spacer 32 is arranged in a lattice pattern between the main body 20 and the plate shaped member 35 when viewed from the heating object. The spacer 32 is adhered between main body 20 and the plate shaped member 35 by an adhesive. The air layer 33 is held between the main body 20 and the plate shaped member 35 by the spacer 32. The air layer 33 is a part surrounded by the fixing part 31, the spacer 32, the main body 20, and the plate shaped member 35.

Figure 4:
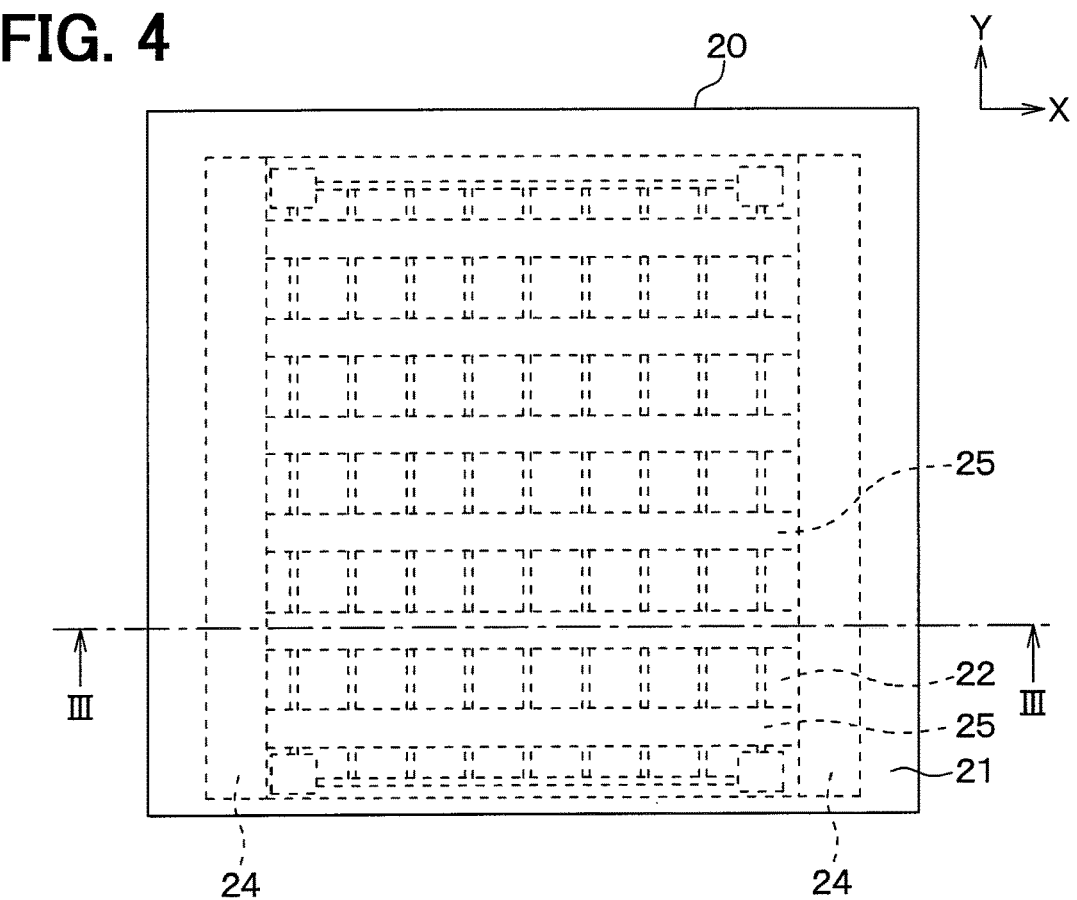
FIG. 4 is a diagram illustrating a front view of a main body.

FIG. 4 is a front view of the main body 20. In FIG. 4, a surface member 21a is omitted. In FIG. 4, the main body 20 extends along the X-Y plane defined by the axis X and the axis Y. The main body 20 has a height along a direction of the axis Z. The main body 20 has a substantially rectangular and thinner plate shape. The main body 20 has the insulated board 22 and the heat generating portion 25. The main body 20 is a planar heater which radiates the radiant heat H mainly in a direction perpendicular to the surface.

The insulated board 22 in the main body 20 has an excellent electrical insulation. The insulated board 22 in the main body 20 is arranged so as to surround each of the plurality of heat generating portions 25, and the insulated board 22 has a thermal conductivity lower than that of the heat generating portions 25. The insulated board 22 and the heat generating portions 25 are located inside of the main body 20.

A surface member 21a is not only required to increase thermal resistance, but also required to protect the main body 20 and to improve the appearance. The surface member 21a is made of for example, a film-like polyimide resin.

The insulated board 22 has an excellent electrical insulation properties and is made of a resin material that resists high temperature. A front surface 22a located on one side in a thick direction of the insulated board 22 is disposed so as to face a part of an occupant as the heating object, when the heater device 1 is installed. A rear surface 22b located on the other side in the thick direction of the insulated board 22 is defined as a back surface of the heater device 1.

The plurality of heat generating portions 25 are connected to the power supply part 24, and generate heat by electric power supplied from the power supply part 24. The plurality of heat generating portions 25 are arranged in a dispersed state on one surface of the insulated board 22. Each of the plurality of heat generating portions 25 is made of a material having a high thermal conductivity. The heat generating portions 25 are also made of an excellent electric conductor, namely a material having a low electric resistance. The heat generating portions 25 can be made of a metallic material. The heat generating portions 25 is selected from a material having a thermal conductivity lower than that of copper. For example, the heat generating portion 25 is alloys of copper and tin, metals such as silver, tin, stainless steel, nickel, nichrome, and alloys containing them.

Each of the plurality of heat generating portions 25 is formed as a thin plate shape parallel to the surface of the insulated board 22. The heat generating portions 25 radiate the radiant heat H due to heat supplied by energization. The heat generating portions 25 are heated to a predetermined radiation temperature, and radiate the radiant heat H that make the passenger 12, namely human, feel warmth. One of the heat generating portions 25 is formed as a rectangular shape extending along the axis X in the X-Y plane. In the heat generating portions 25, the material and the cross sectional dimensions are defined such that the thermal resistance in the direction of the axis X is not more than a predetermined value.

The plurality of heat generating portions 25 are provided on the rear surface 22b of the insulated board 22 so as not to overlap each other. The plurality of heat generating portions 25 are disposed apart from each other in the direction of the axis Y. The plurality of heat generating portions 25 are regularly arranged so as to occupy a predetermined area on X-Y plane in the figure. Namely, the heat generating portions 25 are separated by a predetermined heat capacity and regularly arranged.

As shown in FIG. 3, the pair of power supply parts 24 have a rectangular shape extending in the axis Y direction, and are arranged so as to be electrically brought into contact with both end parts in the axis X of the plurality of heat generating portions 25, respectively. Accordingly, the plurality of heat generating portions 25 are connected to the power supply parts 24 in parallel. A predetermined voltage is applied to the both end parts in the axis Y of the power supply parts 24. Electrical power is supplied to the power supply parts 24 from an external power supply, and the supplied electrical power is supplied to the heat generating portions 25. An electric resistivity of the power supply parts 24 is set to be lower than that of the heat generating portions 25. The power supply parts 25 are made of a copper. The cross sectional area in the heat generating portions 25 is set to be smaller than that of the power supply parts 24. Accordingly, in the power supply parts 24, heat generation is suppressed even when large current flows.

Such main body 20 can be constructed using a technique similar to the main body of the heater device described in Patent Literature 1.

Next, an operation of the heater device in the embodiment is explained. The predetermined voltage is applied to the power supply parts 24 from the power supply (not shown). When the energization to the heat generating portions 25 is started, the heat generating portions 25 generate heat. The radiant heat is radiated toward the heating object from the radiating surface Sh of the main body 20 by using heat of the heat generating portions 25.

Since the air layer 33 is formed by the air layer forming member 30 on the side opposite to the radiating surface Sh of the main body 20, the amount of heat transferred from the main body 20 to the plate shaped member 35 is suppressed. Furthermore, the amount of heat transferred from the plate shaped member 35 to the main body 20 is also suppressed. Accordingly, the transfer amount of heat from the heater body 40 to the object in contact with the heater body 40 is suppressed.

Figure 5:
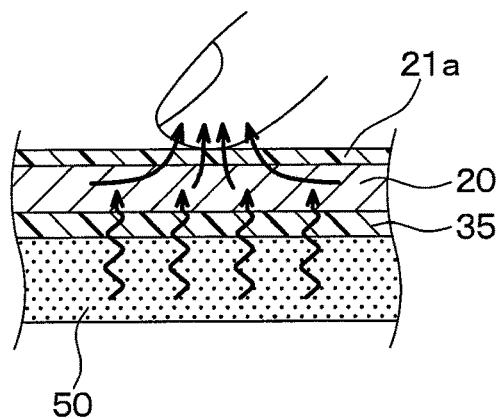
FIG. 5 is a diagram showing a heat transfer in a comparative example.

FIG. 5 shows the configuration of the heater device 1 in which the air layer is not provided between the main body 20 and the plate shaped member 35, as a comparative example. In such configuration, the amount of heat stored in the heat insulating member 50 by heat transferred from the heat generating portions 25 of the main body 20 is easy to move to the fingers of the human body which touches the main body 20, and the person who touches the main body 20 feels the heat more than expected.

Figure 6:
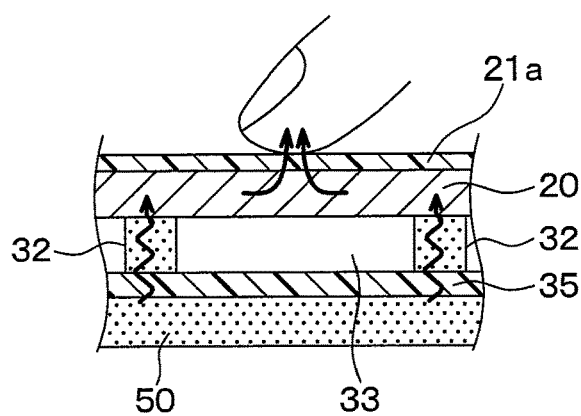
FIG. 6 is an explanatory diagram showing a heat transfer in the heater device according to the first embodiment.

According to the heater device 1 in the present embodiment, since the air layer 33 is formed between the main body 20 and the plate shaped member 35, the heat insulating effect is obtained by the air layer 33 as shown in FIG. 6. Due to the heat insulating effect, the amount of stored heat by heat transferred from the heat generating portions 25 of the main body 20 to the heat insulating member 50 is reduced, and the amount of heat moving to the fingers of the human body which touches the main body 20 can be reduced. Namely, even if the thickness of the heater body 40 is large, and the heat transfer amount transferring to the object which contacted the heater body 40 can be suppressed.

According to the above configuration, the air layer forming member 30 for forming the air layer 33 between the main body 20 and the plate shaped member 35 is provided on the main body 20 and on the side opposite to the radiating surface Sh of the main body 20. The amount of heat transferred from the main body 20 to the plate shaped member 35 is suppressed due to the air layer 33, furthermore, the amount of heat transferred from the plate shaped member 35 to the main body 20 is also suppressed due to the air layer 33. Namely, even if the thickness of the heater body 40 including the main body 20 is large, the heat transfer amount transferring from the heater body 40 to the object which contacted the heater body 40 can be suppressed.

The main body 20 has the insulated board 22 and the plurality of heat generating portions 25 are separately arranged on the insulated board 22. Accordingly, when the object touches the heater body 40, the temperature on a part which touches the heater body 40 can be rapidly dropped.

The air layer 33 formed by the air layer forming member 30 is interposed between the heat insulating member 50 and the main body 20. Accordingly, the heat transferred from the main body 20 can be blocked by the heat insulating member 50.

Second Embodiment

Figure 7:
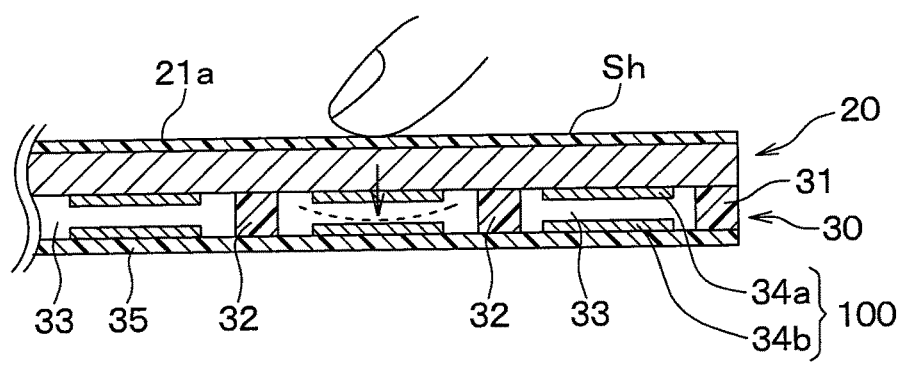
FIG. 7 is a diagram illustrating a cross sectional view of the heater body in the heater device in a second embodiment.
Figure 8:
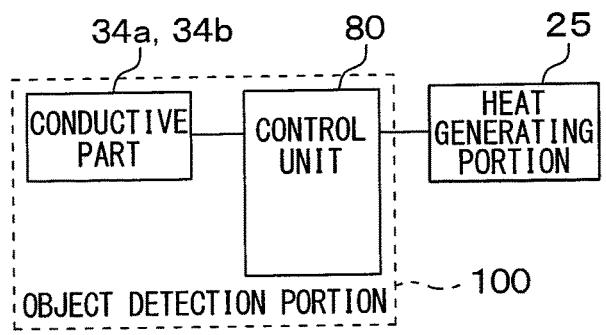
FIG. 8 is a block diagram showing the heater device according to the second embodiment.
Figure 9:
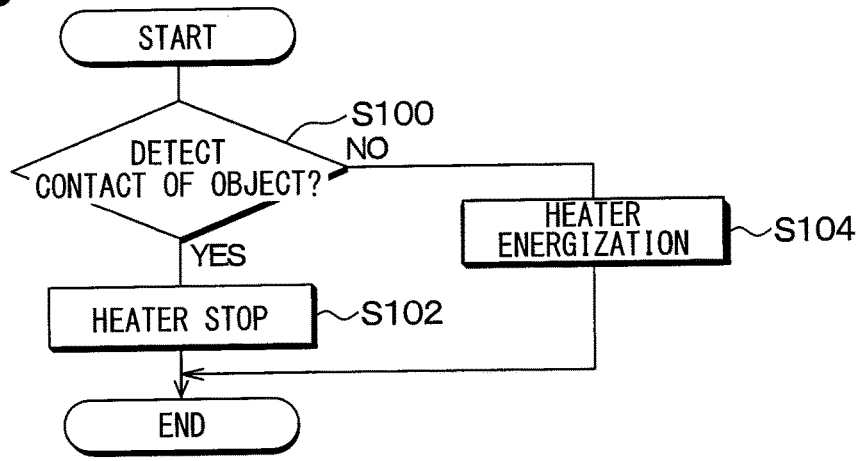
FIG. 9 is a flow chart of a control unit in the heater device according to the second embodiment.

The heater device according to the second embodiment is explained with reference to FIGS. 7 to 9. FIG. 7 is the cross sectional view of the heater body 40 in the heater device in the present embodiment. FIG. 8 is the block chart of the heater device in the present embodiment. FIG. 9 is the flow chart of the control unit 80. The present heater device 1 further includes an object detection portion 100 for detecting the contact of the object to the main body 20 in comparison with the heater device according to the first embodiment.

The object detection portion 100 has conductive parts 34a and 34b disposed to face each other inside the air layer 33, and the control unit 80 for detecting the contact of the object to the main body 20 based on current flowing between the conductive parts 34a and 34b. The conductive parts 34a and 34b are made of a conductive metal, such as copper, gold. The heater device 1 in the present embodiment has an object detection layer as a pressure sensitive contact type in which the conductive parts 34a and 34b are located inside the air layer 33.

The control unit 80 is configured as a computer having a CPU, a RAM, a ROM, and an I/O, and the CPU executes various processing according to a program stored in the ROM. The RAM and the ROM are non-transient physical storage media.

The conductive part 34a is provided on the opposite surface of the main body 20 with respect to the radiating surface Sh, and the conductive part 34b is provided on the surface on the main body 20 side of the plate shaped member 35. The conductive parts 34a and 34b disposed to face each other are arranged at positions overlapping each other, when viewed from the side of the heating object through the conductive parts 34a and 34b. Regarding the conductive parts 34a and 34b disposed to face each other, one pair or a plurality of pairs are provided.

When the conductive part 34a and the conductive part 34b are not contacted each other, current does not flow between the conductive parts 34a and 34b. When the object contacts the main body 20 and the conductive part 34a and the conductive part 34b are in contact with each other by deforming the main body 20, current flows between the conductive parts 34a and 34b.

The control unit 80 includes a voltage detection part (not shown) for detecting the voltage corresponding to the amount of current flowing between the conductive parts 34a and 34b. The control unit 80 executes an object detection processing based on the voltage value detected by the voltage detection part.

FIG. 9 shows the flow chart regarding the object detection processing. The control unit 80 proceeds the processing shown in FIG. 9 periodically. Each control step in the flow chart in FIG. 9 constitutes a variety of function realizing units in the control unit 80.

The control unit 80 determines whether the contact of the object is detected in step S100. In detail, when the voltage value detected by the voltage detection part is above a predetermined voltage value, the control unit 80 determines that the contact of the object to the main body 20 is detected.

When the voltage value detected by the voltage detection part is below the predetermined voltage value, in step S100, NO is determined. The control unit 80 does not stop the heater output, and continues energization to the heat generating portions 25 in step S104. After that the present proceeding is finished.

When the voltage value detected by the voltage detection part is above the predetermined voltage value, in step S100, YES is determined. The control unit 80 stops the heater output in step S102. In detail, the energization to the heat generating portions 25 is stopped and the present proceeding is finished.

In the present embodiment, the same effects as the first embodiment can be obtained from the configuration common to the first embodiment.

Since the object detection portion 100 for detecting the contact of the object to the main body 20 is provided, the contact of the object to the main body 20 can be detected.

Since the object detection portion 100 has the plurality of conductive parts 34a and 34b disposed to face each other in the air layer 33, the object detection portion 100 can detect the contact of the object to the main body 20 by the plurality of conductive parts 34a and 34b.

In the apparatus in which the detection portion is integrated with the main body, described in the patent literature 1, the present inventors found out that it felt the heat more than expected, when the object touches the heater body in which the detection portion is integrated with the main body. Namely, the thickness of the heater device 1 is increased due to the integration of the detection portion with the main body.

In the heater body 40 in the present embodiment, the air layer is formed between the main body 20 and the plate shaped member 35. As a result, even if the thickness of the heater body 40 is large, it is possible to suppress the transferring amount of heat to the object touched to the heater body 40 from the heater body 40.

Since the object detection portion 100 has the control unit 80 for stopping the energization to the main body 20 when the plurality of conductive parts 34a and 34b come in contact with each other, it is possible to reduce the thermal discomfort to people when the human body touches the heat generating portion.

Third Embodiment

Figure 10:
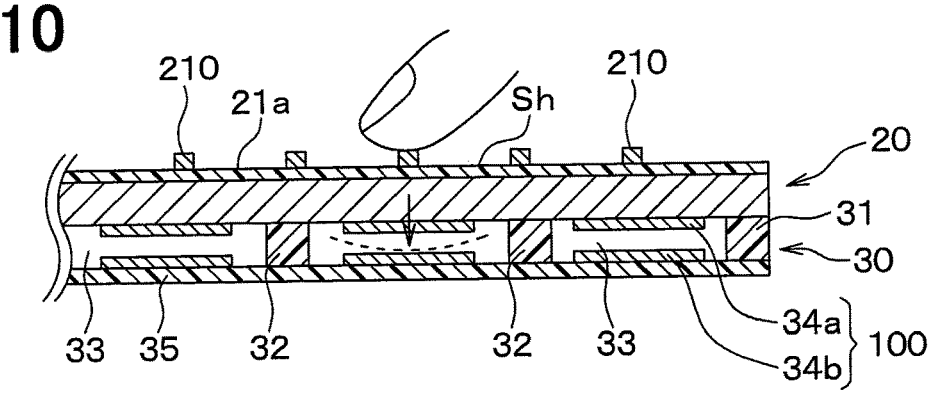
FIG. 10 is a diagram illustrating a cross sectional view of the heater body in the heater device in a third embodiment.

The heater device according to the third embodiment is explained with reference to FIGS. 10 to 12. FIG. 10 is the cross sectional view of the heater body in the heater device according to the third embodiment. The heater device 1 in the present embodiment further includes a plurality of load concentration parts 210 provided on the surface member 21a of the heater device 1. Each of the load concentration parts 210 is a protrusion protruding toward the heating object from the surface member 21a of the heater device 1. Each of the load concentration parts 210 is formed as a convex shape for concentrating the load due to the stress by a finger and the pressing force. Each of the load concentration parts 210 is arranged in a lattice pattern when viewed toward the main body 20 from the heating object. A part of the load concentration parts 210 is arranged at positions overlapping with the conductive parts 34a and 34b, when viewed from the side of the heating object through the conductive parts 34a and 34b. In more detail, as shown in FIG. 10, each of the load concentration parts 210 overlaps with a part of the conductive part 34a in the thickness direction (namely, Z direction) of the main body 20.

Figure 11:
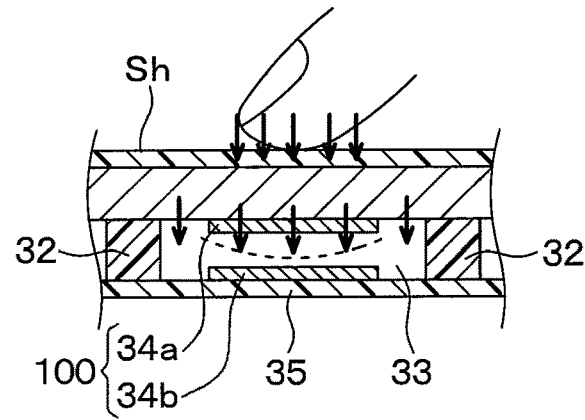
FIG. 11 is an explanatory diagram showing an operation of the comparative example where load concentration part is not provided.

FIG. 11 shows a comparative example in which the load concentration part 210 is not provided on the surface member 21a of the heater device 1. In the configuration in which the load concentration part 210 is not provided on the surface member 21a of the heater device 1 as in the comparative example, when a load is applied to the surface member 21a of the heater device 1 by the user's finger, the load is dispersed and transmitted to the conductive part 34a. For this reason, it is necessary to press the surface member 21a of the heater device 1 with a large load in order to bring the conductive parts 34a and 34b into contact state.

Figure 12:
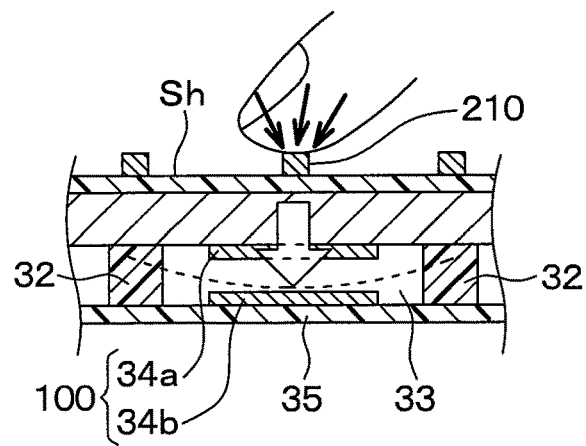
FIG. 12 is an explanatory diagram showing an operation of the heater device according to a third embodiment.

On the other hand, as shown in FIG. 12, in the configuration in which the load concentration parts 210 are provided on the surface member 21a of the heater device 1, when the load is applied to the load concentration parts 210 provided on the surface member 21a of the heater device 1 by the user's finger, the load is concentrated and transmitted to the conductive part 34a. For this reason, it is possible to bring the conductive parts 34a and 34b into contact state with a relatively small load.

In the present embodiment, the same effects as the first embodiment can be obtained from the configuration common to the first embodiment.

As mentioned above, since the main body 20 has the load concentration parts 210 protruding toward the heating object, it is possible to deform the main body 20 with a small load when the object touches the load concentration part 210.

Fourth Embodiment

Figure 13:
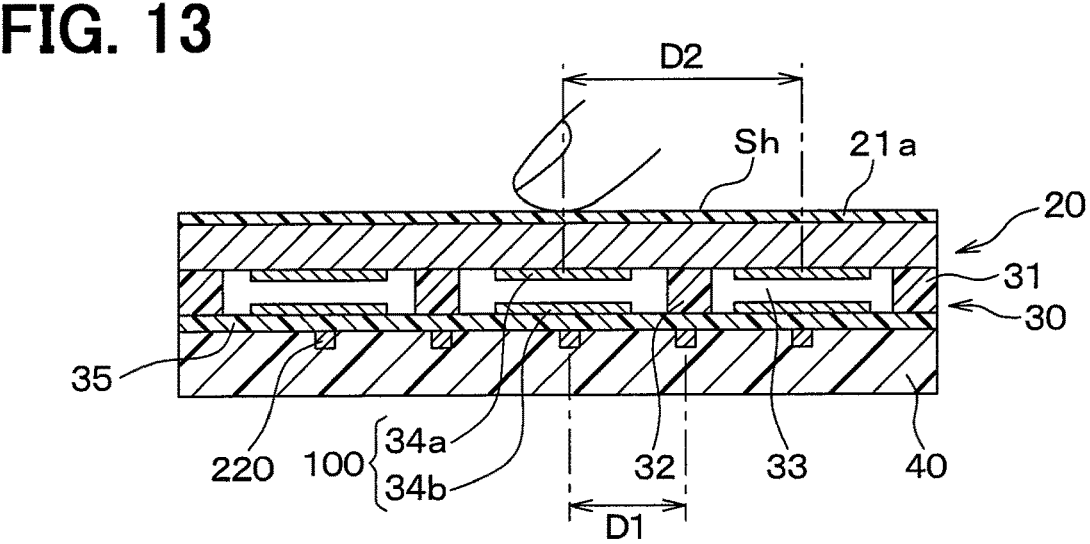
FIG. 13 is a cross sectional view of the heater device according to a fourth embodiment.

The heater device according to the fourth embodiment is explained with reference to FIGS. 13 and 14. In comparison with the heater device 1 in the third embodiment in which the load concentration parts 210 are provided on the heating object side in the main body 20, in the heater device in the present embodiment, the load concentration parts 220 are provided on the surface of the main body 20 on the opposite side with respect to the heating object, namely on the side opposite to the heating object side.

The main body 20 has the load concentration parts 220 protruding to the side opposite to the heating object side of the main body 20. The load concentration parts 220 are a protrusion protruding toward the side opposite to the heating object side in the main body 20. Each of the load concentration parts 220 is formed as a convex shape in order to concentrate the stress due to a finger and the load due to pressing.

In the configuration in which the main body 20 has the load concentration parts 220 protruding to the side opposite to the heating object side of the main body 20, as in the third embodiment, it is possible to deform the main body 20 with a small load when the object touches the main body 20.

Figure 14:
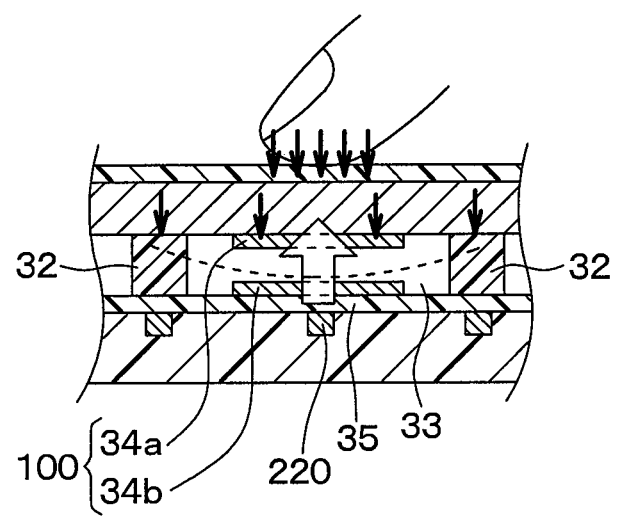
FIG. 14 is an explanatory diagram showing an operation of the heater device according to the fourth embodiment.

As shown in FIG. 14, a distance in a planar direction of the main body 20 between adjacent concentration parts 220 is smaller than that between adjacent conductive parts 34*a* and 34*b*. In other words, as shown in FIG. 13, a distance D1 is smaller than a distance D2. The distance D1 is a distance between adjacent concentration parts 220 and in the planar direction of the main body 20. The distance D2 is a distance in the planar direction of the main body 20 between adjacent conductive parts 34*a* and 34*b*. For this reason, it is possible to suppress the dispersion of the load due to the pushing pressure by the finger and to concentrate it in the vicinity of the center of the conductive parts 34*a* and 34*b*.

Other Embodiments

[1] In the above embodiments, the heater device 1 has a configuration that the temperature on a part which touches the heat generating portion is rapidly dropped, when the object touches the heat generating portion. Namely, the main body 20 has the insulated board 22 and the plurality of heat generating portions 25 are separately arranged on the insulated board 22. However, even if it is not the heater device having such a structure and even if the thickness of the heater body having the main body is large as in the above embodiments, it is possible to obtain the effect that the amount of heat transfer from the heater body to the object touched the heater body can be suppressed.

[2] In the above embodiments, the cylindrical spacers 32 are arranged in the lattice pattern. However, for example, a dot-like patterns printed on the plate shaped member 35 may be made to function as the spacers. A thin film having an insulating properties and having holes may be made to function as the spacers.

[3] In the above embodiments, the heat insulating member 50 is provided on the opposite side with respect to the radiating surface Sh of the main body 20. However, instead of the heat insulating member 50, a cushioning member for absorbing vibrations may be provided. Both the heat insulating member 50 and the cushioning member may be provided on the opposite side with respect to the radiating surface Sh of the main body 20. The heat insulating member 50 may be formed of, for example, PET fiber having a small heat capacity and an excellent heat insulating properties. PET is an abbreviation of polyethylene telephthalate.

[4] In the above embodiments, the surface member 21*a* has a film like surface member for protecting the main body 20 and improving an appearance. The surface member 21*a* may be formed of, for example, a textile cloth, a leather cloth, and the like.

[5] In the above embodiments, the fixing part 31 and the spacer 32 are adhered between the main body 20 and the plate shaped member 35 by an adhesive. However, the fixing part 31 and the spacer 32 themselves may be formed from an adhesive.

[6] In the second embodiment, the object detection portion 100 detects the contact of the object by means of conductive parts 34*a* and 34*b*. The object detection portion 100 can also detect the proximity or the contact of the object by detecting a change of an electrostatic capacity or detect the contact of the object by using a resistance film.

[7] In the second embodiment, the control unit 80 stops the energization to the main body 20, when the plurality of conductive parts 34*a* and 34*b* are in contact with each other. However, the control unit 80 may reduce the amount of the energization to the main body 20 without stopping the energization, when the plurality of conductive parts 34*a* and 34*b* are in contact with each other.

[8] In the third and fourth embodiments, the load concentration parts 210 and 220 are arranged in the lattice pattern when viewed toward the main body 20 from the heating object. The load concentration parts 210 and 220 may be a net-like structure configured by using a net-like member called a 3D net structure. By adopting such a net-like structure, a simple supporting structure can be obtained.

[9] In the above embodiments, the heater device 1 is installed inside of a road traveling vehicle. An installation target of the heater device 1 is not limited to the road traveling vehicle, for example, it can be installed in a room of a mobile body such as ship, an aircraft, or the like.

Another Embodiment

The present disclosure is not limited to the embodiments described above, and can be appropriately changed. For example, various modifications can be made as follows. The above embodiments are not unrelated to each other and can be appropriately combined, unless a combination is clearly impossible. In the above embodiments, it goes without saying that the constituent elements of the embodiment are not necessarily indispensable except for the case where it is clearly indispensable and the case where it is considered to be obviously indispensable in principle. In the above embodiments, when value regarding number, numerical values, quantity, or range, etc. of the components in the embodiments is mentioned, it is not limited to the specific value, except for the case where it is dearly indispensable and the case where it is clearly limited to a specific number in principle. In the above embodiments, when a material, a shape, or a positional relationship of the components is mentioned, it is not limited to the specific shape or the specific positional relationship except for the case where it is clearly indispensable and the case where it is clearly limited to a specific shape or a specific positional relationship in principle.

The invention claimed is:
1. A heater device, comprising:
a sheet shaped main body having an insulated board, a thin plate-shaped heater configured to output heat in response to receiving electrical energy, and a radiating surface configured to radiate radiant heat toward a heating object using the heat output by the thin plate-shaped heater;
a plate shaped member arranged adjacent to the sheet shaped main body and on a side opposite to the radiating surface of the sheet shaped main body;
an air layer forming member having a fixer part and a spacer and configured to form an air layer between the sheet shaped main body and the plate shaped member, the air layer forming member being arranged on the sheet shaped main body on the side opposite to the radiating surface of the sheet shaped main body;
a surface member disposed on the radiating surface; and
an object detection portion having (i) a plurality of conductive parts disposed to face each other inside the air layer and (ii) a controller having a processor and a voltage detection part, the controller being electrically connected to the plurality of conductive parts and the thin plate-shaped heater, wherein
the insulated board includes a front surface oriented toward the radiating surface, and a rear surface oriented away from the radiating surface, the insulated board is electrically insulated and has a thermal conductivity lower than a thermal conductivity of the thin plate-shaped heater, the thin plate-shaped heater is disposed on the rear surface of the insulated board, the surface member is configured to increase a thermal resistance between the heating object and the heater device in response to the heating object contacting the heater device, and to protect the sheet shaped main body, the plurality of conductive parts are configured to
contact each other in response to the heating object contacting the heater device, and
flow an electrical current between the plurality of conducive parts in response to the plurality of conductive parts contacting each other, and the controller is configured to
control an amount of energy received by the thin plate-shaped heater,
detect a voltage corresponding to the electrical current flowing between the plurality of conductive parts,
compare the detected voltage to a predetermined voltage value, and
reduce the amount of electrical energy received by the thin plate-shaped heater in response to the detected voltage exceeding the predetermined voltage value.

2. The heater device according to claim 1, wherein the sheet shaped main body has a protrusion protruding toward the heating object.

3. The heater device according to claim 1, wherein the sheet shaped main body has a protrusion protruding on a side opposite to the heating object on the main body.

4. The heater device according to claim 1, wherein the protrusion has a net-like structure configured by using a net-like member.

5. The heater device according to claim 1, wherein the heater device is installed on a vehicle.

6. The heater device according to claim 1, wherein the air layer is a part surrounded by the air layer forming member, the sheet shaped main body, and the plate shaped member.

* * * * *